(12) United States Patent
Svendsen et al.

(10) Patent No.: US 10,328,442 B2
(45) Date of Patent: Jun. 25, 2019

(54) ON-DEMAND HIGH VOLUME, LOW PRESSURE SPRAY SYSTEM

(71) Applicant: Graco Minnesota Inc., Minneapolis, MN (US)

(72) Inventors: John M. Svendsen, Corcoran, MN (US); Diane L. Olson, Elk River, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 20 days.

(21) Appl. No.: 15/437,019

(22) Filed: Feb. 20, 2017

(65) Prior Publication Data
US 2017/0239675 A1    Aug. 24, 2017

Related U.S. Application Data

(60) Provisional application No. 62/449,078, filed on Jan. 22, 2017, provisional application No. 62/297,917, filed on Feb. 21, 2016.

(51) Int. Cl.
| | |
|---|---|
| *B05B 12/00* | (2018.01) |
| *B05B 7/24* | (2006.01) |
| *B05B 7/00* | (2006.01) |
| *B05B 12/08* | (2006.01) |
| *G05D 16/20* | (2006.01) |

(Continued)

(52) U.S. Cl.
CPC .......... *B05B 7/2416* (2013.01); *B05B 7/0081* (2013.01); *B05B 7/068* (2013.01); *B05B 7/2424* (2013.01); *B05B 7/2437* (2013.01); *B05B 12/00* (2013.01); *B05B 12/002* (2013.01); *B05B 12/085* (2013.01); *G05D 16/2066* (2013.01); *B05B 7/0815* (2013.01); *B05B 7/247* (2013.01); *B05B 7/2472* (2013.01); *B05B 7/2478* (2013.01); *B05B 7/2481* (2013.01); *F04D 17/16* (2013.01); *F04D 25/06* (2013.01); *F04D 27/004* (2013.01)

(58) Field of Classification Search
CPC ..... B05B 7/2416; B05B 7/0081; B05B 7/068; B05B 7/241; B05B 7/2424; B05B 7/2437; B05B 12/002; B05B 12/085; G05D 16/2066; F04D 17/16; F04D 25/06; F04D 27/004
USPC ..... 239/8, 526–528, 332; 137/511; 417/44.2
See application file for complete search history.

(56) References Cited

U.S. PATENT DOCUMENTS

| 4,854,822 A * | 8/1989 | Darroch | ............... B05B 7/2491 |
| | | | 417/62 |
| 5,074,467 A * | 12/1991 | Geberth | ............... B05B 7/0081 |
| | | | 200/81.9 R |

(Continued)

*Primary Examiner* — Steven J Ganey
*Assistant Examiner* — Joseph A Greenlund

(57) ABSTRACT

Various embodiments concern a sprayer having a blower that outputs a HVLP flow of air into a hose, the hose connecting with a spray gun. A pressure sensor measures pressure of the HVLP air within the hose via a tube that branches from a fitting to which the hose connects. If the sensor indicates that the pressure level has increased above a threshold amount, indicating that the trigger of the spray gun is not being actuated, then power output to the blower is reduced (e.g., stopped). HVLP air is trapped within the hose by two valves when the trigger is not actuated. When the sensor indicates that the pressure level has decreased, corresponding to release of the trapped HVLP air into the gun for spraying by actuation of the trigger, power to the blower is increased (e.g., resumed).

23 Claims, 5 Drawing Sheets

(51) Int. Cl.
  *B05B 7/06* (2006.01)
  *F04D 17/16* (2006.01)
  *F04D 25/06* (2006.01)
  *F04D 27/00* (2006.01)
  *B05B 7/08* (2006.01)

(56) References Cited

U.S. PATENT DOCUMENTS

| | | | |
|---|---|---|---|
| 5,279,461 A | 6/1994 | Darroch | |
| 5,320,280 A * | 6/1994 | Murphy | B05B 7/24 137/885 |
| 5,429,307 A | 7/1995 | Darroch | |
| 5,711,483 A * | 1/1998 | Hays | B05B 12/085 222/63 |
| 5,772,403 A * | 6/1998 | Allison | F04B 49/065 417/44.2 |
| 7,032,839 B2 | 4/2006 | Blette et al. | |
| 7,350,723 B2 * | 4/2008 | Reedy | B05B 7/2416 239/296 |
| 7,950,598 B2 * | 5/2011 | Olson | B05B 7/2437 239/331 |
| 8,197,221 B2 * | 6/2012 | Lemmer | B05B 7/2416 239/332 |
| 8,490,892 B2 | 7/2013 | Escoto, Jr. et al. | |
| 8,850,827 B2 * | 10/2014 | Franconi | F01D 3/00 137/540 |
| 8,955,770 B2 | 2/2015 | Joseph et al. | |
| 9,132,442 B2 * | 9/2015 | Yan | B05B 12/006 |
| 9,140,153 B2 * | 9/2015 | Valencia | F01M 11/02 |
| 9,599,117 B2 * | 3/2017 | Darroch | F04D 27/004 |
| 9,810,128 B2 * | 11/2017 | Brocker | F01N 3/32 |
| 2005/0279865 A1 * | 12/2005 | Thomason | B05B 7/16 239/526 |
| 2006/0127227 A1 * | 6/2006 | Mehlhorn | F04D 15/0066 417/53 |
| 2011/0000613 A1 | 1/2011 | Lemmer et al. | |
| 2011/0079654 A1 * | 4/2011 | Bailey | A01G 25/16 239/1 |
| 2014/0271230 A1 | 9/2014 | Darroch | |
| 2015/0067972 A1 * | 3/2015 | Saveyn | C11D 1/65 8/137 |

* cited by examiner

ON-DEMAND HIGH VOLUME, LOW PRESSURE SPRAY SYSTEM

CROSS-REFERENCE TO RELATED APPLICATION(S)

This application claims priority to U.S. Provisional Application No. 62/297,917 filed Feb. 21, 2016, entitled "ON-DEMAND HIGH VOLUME, LOW PRESSURE SPRAY SYSTEM", and to U.S. Provisional Application No. 62/449,078 filed Jan. 22, 2017, entitled "ON-DEMAND HIGH VOLUME, LOW PRESSURE SPRAY SYSTEM", the disclosures of which are hereby incorporated by reference in their entireties.

BACKGROUND

A high volume, low pressure (HVLP) spray system is commonly comprised of an air source that produces a high volume of air flow at low pressure. A motor is typically used to generate the HVLP air flow. The HVLP air is directed through a gun to propel paint onto a targeted substrate. The motor generally operates in an always-on constant level of operation in which the motor is always outputting pressurized air regardless of whether the user is spraying at the moment. The constant operation of the blower causes excessive motor wear, energy consumption, heat generation, and noise. The motor may be manually turned off via a main power switch by the user when not in use to cause the motor to stop and the pressurized air to dissipate out of the HVLP spray system. The HVLP system can be manually turned back on when the user wishes to resume spraying, however the motor will have to accelerate to reach a speed adequate for generating HVLP air and then the system will have to be refilled with HVLP air by the motor before spraying can be resumed.

SUMMARY

This disclosure concerns sprayers having on-demand spraying capability even when power to an electric air supply unit has been reduced due to previous spraying inactivity. Examples are provided in the following paragraphs of this section to summarize some, but not necessarily all, inventive aspects of this disclosure.

In example 1, a sprayer having an air supply unit comprising a motor, the air supply unit configured to output a high volume flow of pressurized air by operation of the motor. The sprayer further includes a hose having a first end and a second end, the first end receiving the pressurized air output by the air supply unit, and a spray gun having a trigger and a first valve, the second end of the hose connected to the spray gun, wherein actuation of the trigger causes the first valve to open and the spray gun to spray fluid using the pressurized air from the hose. The sprayer further includes a second valve located upstream of the hose and through which at least some of the pressurized air output by the air supply unit flows, and a sensor that outputs a signal indicative of whether the trigger is actuated. The sprayer further includes control circuitry that receives the signal and regulates power output to the motor, the control circuitry configured to reduce electrical power output to the motor based on the signal indicating that the trigger is not actuated, and increase electrical power output to the motor based on the signal indicating that the trigger is actuated, wherein a volume of the pressurized air is trapped within the hose by the first and second valves when the first and second valves are closed, and the volume of the pressurized air is used by the spray gun for spraying while the trigger is actuated yet the motor is accelerating.

In example 2, the sprayer of the first example, wherein the sensor is a pressure sensor.

In example 3, the sprayer of either example 1 or 2, wherein the signal is indicative of a parameter of the pressurized air when the pressurized air is either trapped or flowing between the first and second valves.

In example 4, the sprayer of example 3, wherein the control circuitry is configured to reduce electrical power output to the motor based on the signal indicating that the trigger is not actuated by indicating that the parameter of the pressurized air has increased.

In example 5, the sprayer of either of examples 3 or 4, wherein the control circuitry is configured to increase electrical power output to the motor based on the signal indicating that the trigger is actuated by indicating that the pressure of the pressurized air has decreased.

In example 6, the sprayer of any of examples 1-5, wherein the sensor is exposed to pressurized air via a tube that branches from a pneumatic circuit between the first and second valves.

In example 7, the sprayer of any of examples 1-6, wherein the second valve is located within a fitting to which the hose attaches.

In example 8, the sprayer of any of examples 1-7, wherein the second valve is a check valve.

In example 9, the sprayer of any of examples 1-8, wherein the first valve is located within a body of the spray gun.

In example 10, the sprayer of any of examples 1-9, wherein the air supply unit comprises a blower.

In example 11, the sprayer of any of examples 1-10, wherein, in reaction to actuation of the trigger, the volume of the pressurized air that was trapped in the hose is released into the spray gun and used for spraying fluid while the control circuitry increases electrical power output to the motor to accelerate the motor to resupply pressurized air to the hose.

In example 12, the sprayer of any of examples 1-11, wherein the control circuitry is configured to reduce electrical power output to the motor based on the signal indicating that the trigger is not actuated by: starting a timer for a predetermined amount of time and then reducing electrical power output to the motor if the signal indicates that the trigger was not actuated during the counting of the timer, but not reducing electrical power output to the motor if the signal indicates that the trigger was actuated during the counting of the timer.

In example 13, the sprayer of any of examples 1-12, wherein the control circuitry is configured to reduce the supply of electrical power to the motor based on the signal indicating that the trigger is not actuated by stopping delivery of power to the motor.

In example 14, the sprayer of any of examples 1-13, wherein the control circuitry is configured to increase the supply of electrical power to the motor based on the signal indicating that the trigger is actuated by resuming delivery of power to the motor.

In example 15, the sprayer of any of examples 1-14, further comprising a fluid reservoir attached to the spray gun from which the spray gun draws fluid for spraying.

In example 16, a method of controlling a sprayer comprising providing power to an motor of an air supply unit based on a signal output from a sensor, the air supply unit outputting a high volume flow of pressurized air, the pressurized air flowing within a hose and through two valves, the two valves respectively located upstream and downstream of the hose, the signal indicative of a parameter of the pressurized air within the hose. The method further comprises reducing power to the motor based on the signal indicating an increase in a level the parameter. The method further comprises increasing power to the motor based on the signal indicating a decrease in the level of parameter. The method further comprises spraying fluid from a spray gun using a volume of the pressurized air while performing the step of increasing power to the motor, the volume of pressurized air previously having been trapped in the hose between the two valves while the two valves were closed and while a trigger of the spray gun was not actuated, the volume of pressurized air being released due to actuation of the trigger opening one of the two valves, wherein the gun receives the pressurized air from the hose and each of the steps of providing, reducing, and increasing are performed by control circuitry.

In example 17, the method of example 16, wherein: the parameter is pressure of the pressurized air, the step of reducing power to the motor based on the signal indicating the increase in the parameter comprises stopping delivery of power to the motor, and the step of increasing power to the motor based on the signal indicating the decrease in the parameter comprises resuming delivery of power to the motor.

In example 18, the method of either of examples 16 or 17, wherein the step of reducing power to the motor of the air supply unit based on the signal indicating an increase in the parameter comprises: starting a timer for a predetermined amount of time, starting the reduction in electrical power output to the motor if the signal indicates that the trigger was not actuated during the counting of the timer, not reducing electrical power output to the motor if the signal indicates that the trigger was actuated during the counting of the timer.

In example 19, a sprayer comprising a blower configured to output a high volume flow of pressurized air, a hose, and a spray gun having a trigger and a first valve, the spray gun receiving the pressurized air from the blower through the hose, wherein actuation of the trigger causes the first valve to open and the spray gun to spray fluid. The sprayer further comprises a second valve, the second valve being a check valve, and a sensor that outputs a signal indicative of the pressure of the pressurized air. The sprayer further comprises control circuitry that receives the signal, the control circuitry configured to reduce power output to the blower based on the signal indicating an increase in air pressure and increase power output to the blower based on the signal indicating a decrease in air pressure, wherein a volume of the pressurized air is trapped within the hose between the first and second valves when the first and second valves are closed due to the trigger not being actuated, and in reaction to actuation of the trigger, the volume of trapped pressurized air is released in the spray gun and used for spraying fluid while the control circuitry increases power output to the blower to accelerate the blower to resupply the pressurized air to the hose.

In example 20, the sprayer of example 19, wherein the control circuitry is configured to reduce the power output to the blower based on the signal indicating that the pressure has increased by stopping delivery of power to the blower, and the control circuitry is configured to increase the power output to the blower based on the signal indicating that the air pressure has decreased by resuming the delivery of power to the blower.

The scope of this disclosure is not limited to this summary. Further inventive aspects are presented in the drawings and elsewhere in this specification and in the claims.

This disclosure makes use of examples concerning a featured embodiment to demonstrate various inventive aspects. The presentation of the examples and the featured embodiment should be understood as demonstrating a number of open ended combinable options and not restricted embodiment(s). Changes can be made in form and detail to the various embodiments and features without departing from the spirit and scope of the invention.

DETAILED DESCRIPTION

Embodiments of the present disclosure are used to spray fluids. While paint will be used as an exemplar herein, this is merely one example and that other fluids can be sprayed in addition to and/or instead of paint, such as stains, varnishes, finishes, oil, water, coatings, solvents, and/or solutions, amongst other options.

Figure 1:
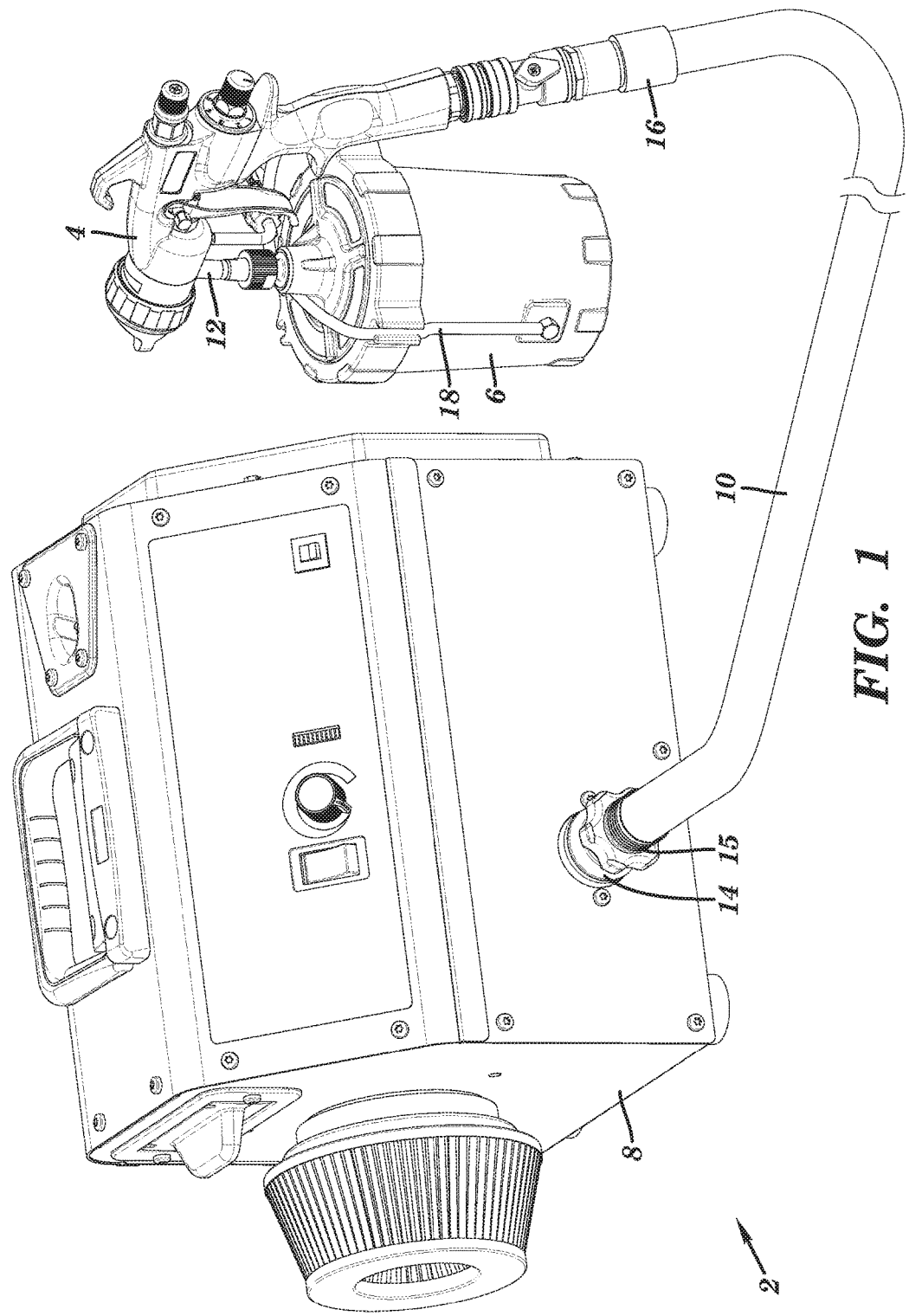
FIG. 1 is an isometric view of a HVLP sprayer.

FIG. 1 is an isometric view of an HVLP system 2. The system comprises a gun 4, a fluid reservoir 6, an air supply unit 8, a fitting 14, and a hose 10. The gun 4 is supplied paint by the reservoir 6 through neck 12. The air supply unit 8 contains various components for providing and controlling pressurized air suitable for HVLP spraying. The pressurized air is conveyed through the fitting 14 of the air supply unit 8, through the hose 10, and to the gun 4. The air flow can be approximately 100 cubic feet per minute. The air supply unit 8 includes a fitting 14 which attaches to a fitting 15 on the first end of the hose 10 (alternatively the fitting 14 attaches to another intermediary fitting that attaches to the fitting 15 of the hose 10). The fittings 14, 15 can connect with one another by a threaded or quick disconnect interface, amongst other options. The hose 10 may be a 1 inch outer diameter hose with a bore size of at least ½ inch (e.g., ⅞ inch inner diameter), in some embodiments, however other sizes are possible. The hose 10 may be at least 15 feet long, and is preferably 20 feet in some embodiments. The hose 10 can be formed from a flexible material, such as polymer or rubber. The hose 10 can be a corrugated tube, as shown in FIG. 1. A fitting 16 on the second end of the hose is attached to the gun 4 (alternatively the fitting 16 attaches to another intermediary fitting that attaches to the gun 4). The fitting 16 can be of a swivel, quick disconnect type for attaching to the gun 4.

The gun 4 is supplied paint by the reservoir 6 through neck 12. The gun 4 can use the pressurized air from the air supply unit 8, as conveyed by the hose 10, in multiple ways. The pressurized air propels the paint from the gun 4 as an atomized spray to paint various surfaces. Also, the gun 4 can route some of the pressurized air through tube 18 to the reservoir 6, the pressurized air forcing the paint within the reservoir 6 up the neck 12 and into the gun 4. However, a gravity feed or other type of paint feed may alternatively be used in various embodiments, thus not requiring pressurized air to be supplied to the reservoir 6.

Figure 2:
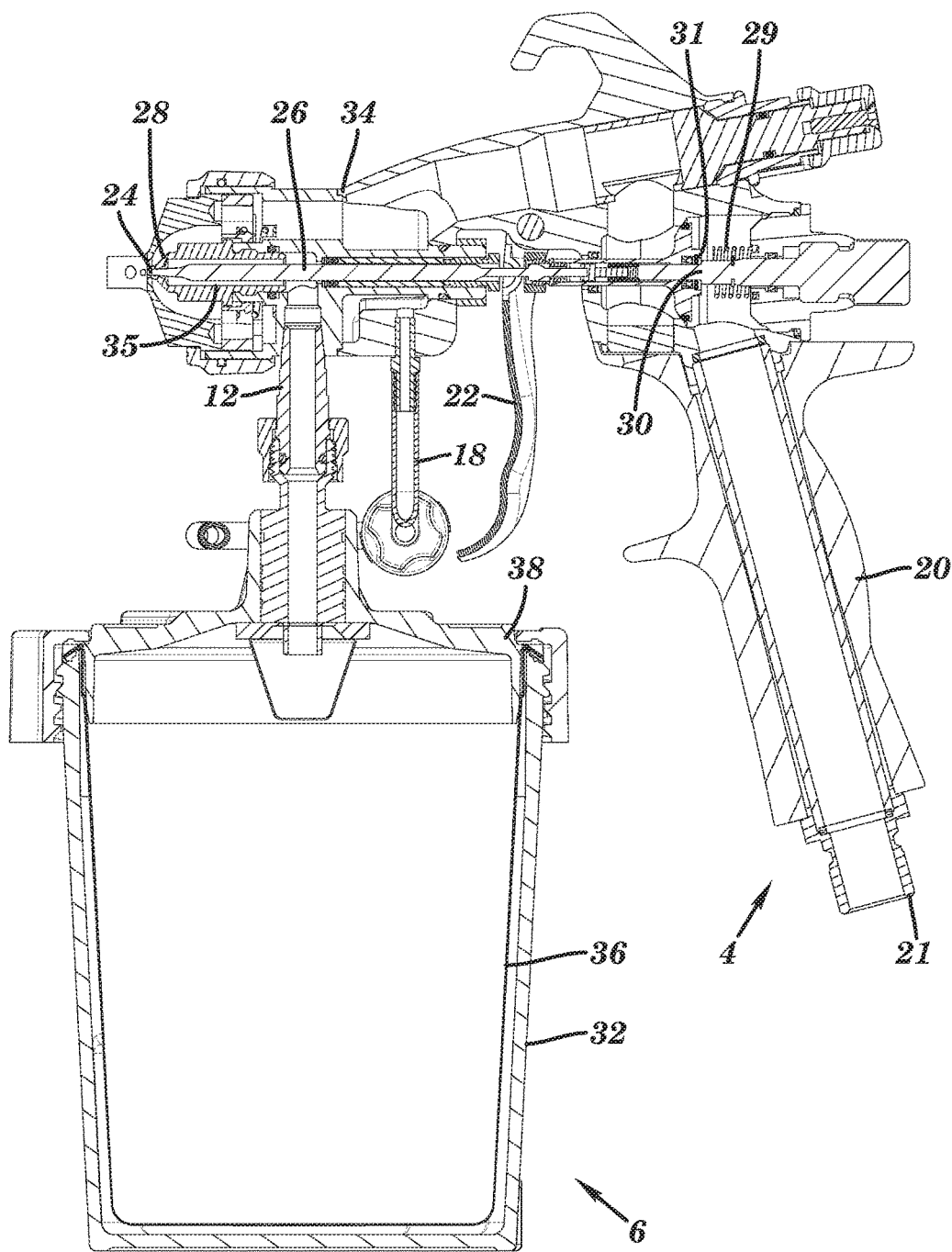
FIG. 2 is a cross sectional view of the gun of an HVLP sprayer.

FIG. 2 is a cross-sectional view of the gun 4 and the reservoir 6. The gun 4 includes a handle 20. The gun 4 includes a port 21 which mechanically connects with fitting 16 to make a sealed, pneumatic connection. The pressurized air supplied by the hose 10 flows through a channel located in the handle 20 and further into the interior of the gun 4. The gun 4 includes a trigger 22. The trigger 22 is mechanically connected to a needle 26. The needle 26 is an elongated metal rod. The trigger 22 is actuated by backward movement, which is toward the handle 20. The trigger 22 is unactuated or released by forward movement, which is away from the handle 20, and which can be driven by spring 29. Movement of the trigger 22 between actuated and unactuated states correspondingly moves the needle 26 backwards and forwards within the gun 4. The needle 26 seals two valves, whereby backward movement of the needle 26 opens the valves and forward movement of the needle 26 closes the valves. The first valve 30 comprises a shoulder or other enlarged portion in the needle 26 engaging an annular seat 31. The first valve 30 is normally closed but opens when the trigger 22 is actuated and the needle 26 is moved backwards, allowing the pressurized air in the channel in the handle 20 to flow into a front body portion 34 of the gun 4. When the trigger 22 is not actuated, the engagement between the shoulder or other enlarged portion in the needle 26 and the annular seat 31 prevents pressurized air in the channel in the handle 20 from flowing into a front body portion 34 of the gun 4. The second valve is formed by the front end of the needle 26 interfacing with the nozzle piece 28, the valve being opened by backward movement of the needle 26.

When the first valve 30 is opened, some of the pressurized air coming into the front body portion 34 flows through the tube 18 into the reservoir 6, which is used to drive paint from the reservoir 6 through the neck 12 that connects the reservoir 6 to the gun 4 and into a paint channel 35 located within the front body portion 34 of the gun 4. The paint channel 35 is coaxial with the needle 26.

The reservoir 6 includes a cup 32. The cup 32 can be formed from a polymer or a metal. The cup 32 is rigid. As shown, the cup 32 contains a liner 36. A lid 38 fits over liner 36 and the cup 32. The liner 36 can contain paint. The liner 36 collapses upwards toward the neck 12 to force the paint up the neck 12 and into the paint channel 35 for spraying. The paint is forced upwards toward and through the neck 12 because the pressurized air that traveled through the tube 18 is introduced into the sealed space between the inside of the cup 32 and the outside of the liner 36 (e.g., at 3-10 pounds per square inch), thereby making the pressure outside the liner 36 greater than inside the liner 36 and collapsing the liner 36 while pushing the paint upwards. Recalling that the backward movement of the needle 26 due to actuating the trigger 22 also opens the valve formed between the front end of the needle 26 interfacing with the nozzle piece 28, the paint that was driven into the paint channel 35 from the neck 16 mixes with the pressurized air near the nozzle 24 and is propelled out of the gun 4 as an atomized spray. The back end of the nozzle piece 28 aligns with the paint channel 35 such as that paint moving through the paint channel 35 moves into and through the nozzle piece 28 to be mixed with the pressurized air for spraying from the nozzle 24.

While the illustrated embodiment uses a collapsible liner 36, various other embodiments may not include a liner 36. In such embodiments, the paint may reside directly in the cup 32. The gun 4 may be modified to invert the cup 32 above the gun 4 in a cup-over arrangement so that the flow of paint from the reservoir is gravity assisted. In a gravity assisted configuration, the tube 18, the liner 36, and supply of pressurized air into the cup 32 may be omitted.

Figure 3:
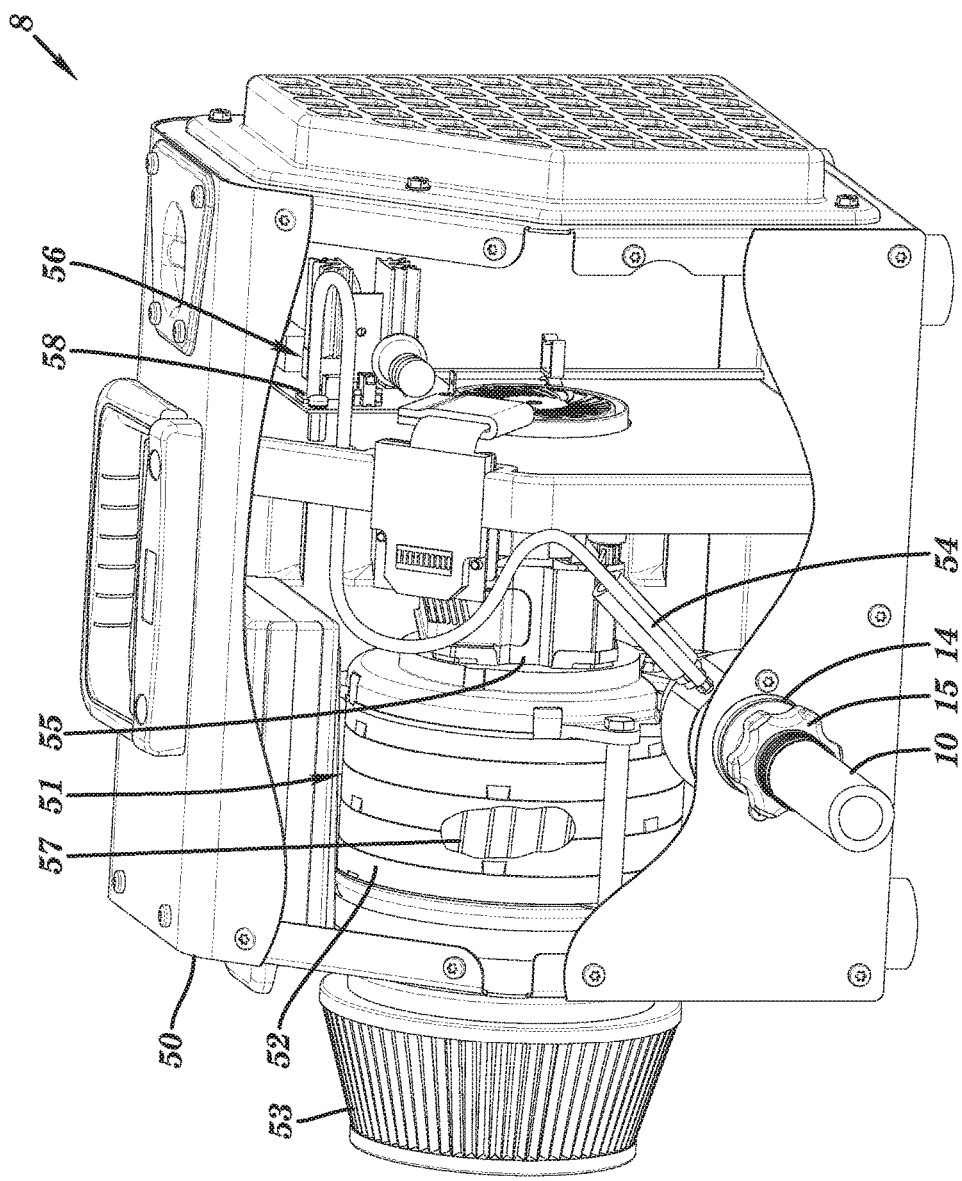
FIG. 3 is a sectional view of the HVLP air supply unit of an HVLP sprayer.

FIG. 3 shows a sectional view of the air supply unit 8. The air supply unit 8 includes a blower 51, control circuitry 56, a sensor 58, and the fitting 14, in the illustrated embodiment. The air supply unit 8 includes a housing 50, which can be a metal or plastic box. The housing 50 can fully or partially contain the blower 51, the control circuitry 56, the sensor 58, and the fitting 14. The fitting 14 is shown to be both partially inside and outside of the housing 50 by extending through a wall of the housing 50, however the fitting 14 may instead be located entirely inside or entirely outside of the housing 50. The fitting 14 connects with the fitting 15 of the hose 10 to create an airtight seal therebetween.

The HVLP air output by the blower 51, when the blower 51 is operating at a sustained level, can have a pressure in the range of 2-10 pounds per square inch. The pressure of the HVLP air at the nozzle 24 can be in the range of 2-10 pounds per square inch, however 3-7 pounds per square inch is typical. The rate of airflow from the blower 51 depends on the degree of restriction in the inlet 53, and the degree of restrictions downstream from the blower 51, amongst other factors. HVLP spraying is typically limited to a pressure of 10 pounds per square inch or less while having no flow rate limits, although the mass of flowing air must be sufficient to atomize paint and therefore is dependent on the type of paint being used.

The blower 51 sucks in ambient air through inlet 53, shown to include an air filter, compresses and accelerates the air within housing 52, and blows the air out of the fitting 14. A sectional view of the housing 52 is shown, revealing blades 57 which are rotated by the motor 55 to compress and move air. The motor 55 is an electrical motor that rotates based on input of electrical power. The motor 55 may be a rotor-stator motor, for example. The power output to the motor 55 can be either direct current or alternating current, depending on the type of motor. The air may be compressed and accelerated by any type of fan, impeller, turbine, or other type of bladed component being rotated within the housing 52 by motor 55. In the embodiment shown, the blower 51 is not a positive displacement pump, but rather is a centrifugal pump. Power output to the motor 55 is regulated by control circuitry 56. Specifically, the control circuitry 56 increases and decreases power output to the turbine 51 by increasing and decreasing power output to the motor 55 to cause the rotational output of the motor 55 to start, stop, speed up from a first non-zero level to a second higher level, and slowdown from the second higher level to the first non-zero level. The air flow output through the fitting 14 by the blower 51 flows into the hose 10 and through to the gun 4. The term "upstream" as used herein means directionally closer to the blower 51 and the term "downstream" as used herein means directionally closer to the gun 4 along the flow path of pressurized air moving from the blower 51 to the gun 4.

The fitting 14 can be formed from metal and/or polymer. As shown in FIG. 3, a first end of a tube 54 is connected to the fitting 14. The tube 54 extends within the housing 50. A second end of the tube 54 connects with sensor 58. The sensor 58 is mounted on a board with control circuitry 56 in the illustrated embodiment, however the sensor 58 may not be located remote from the board supporting the control circuitry 56 in various other embodiments. For example, the sensor 58 may be mounted in the fitting 14, hose 10, or gun 2. The sensor 58 can output a signal indicative of an air parameter, such as a signal indicative of air pressure or air flow. In the illustrated embodiment, the sensor 58 outputs a signal indicative of air pressure within the tube 54, which being tapped from the fitting 14, is indicative of air pressure within the fitting 14. The sensor 58 can be a digital or analog, air pressure or flow sensor that outputs a signal indicative of air pressure or flow. The sensor 58 can be a force collector-type transducer (e.g., a piezoelectric/resistive strain gauge or capacitive/electromagnetic transducer). The sensor 58 can be a microelectromechanical (MEMS) sensor.

Figure 4:
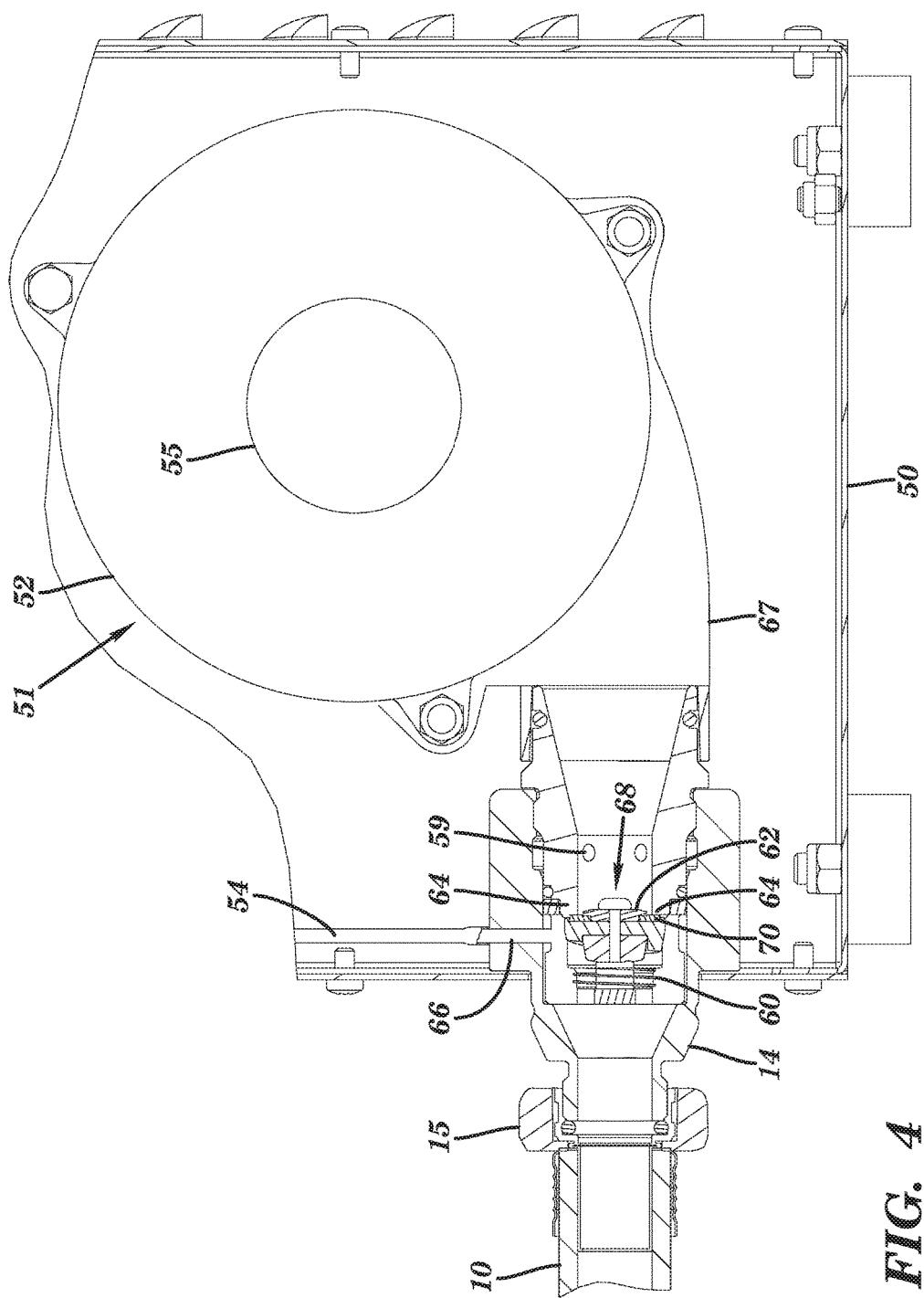
FIG. 4 is a cross sectional view of a fitting and valve of an HVLP sprayer.

FIG. 4 is a sectional view of the air supply unit 8 that shows a cross-section of the fitting 14. The blower 51 is shown to include an outlet 67 which directs the HVLP air flow into the fitting 14. In some embodiments, the fitting 14 may be the outlet of the blower 51. As shown, the fitting 14 contains a valve 68. The valve 68 is shown as a check valve. More specifically, the valve 68 is shown as a poppet-type valve, however other types of valves, such as a ball-type valve, can instead be used. The valve 68 is mechanically activated by air pressure, however an electrically controlled valve, such as a solenoid valve, controlled by the control circuitry 56 to open and close whenever the blower 51 turns on or off, respectively, can be substituted, amongst other options.

The valve 68 includes a seat 64 and a poppet 62, the poppet 62 having a gasket 70 that is pushed against the seat 64 by a spring 60 to prevent airflow in the upstream direction when the valve 68 is closed. The poppet 62 seals against the seat 64 when there is no or minimal pressure differential between the upstream and downstream sides of the valve 68. The valve 68, when closed, prevents pressurized air within the hose 10 (as well as pressurized air that is within the fitting 14 but downstream of the valve 68 and within the tube 54) from moving back upstream past the seal between the seat 64 and the gasket 70 of the poppet 62. The poppet 62 lifts from the seat 64 when pressurized air, generated by the blower 51, pushes against poppet 62 to overcome the spring 60. However, if the valve 30 in the gun 4 is not open (due to the trigger 22 not being pulled), then the air pressure downstream of the valve 68 may equalize with the air pressure upstream of the valve 68, because the air within the hose 10 has no place else to flow, causing the valve 68 to close. Upon actuation of the trigger 22 to open valve 30, the air within the hose 10 and otherwise downstream of the fitting 14 flows into the gun 4, at least temporarily lowering the pressure downstream of the valve 68 and allowing the pressured air upstream of the valve 68 to push against poppet 62 to overcome the spring 60.

The fitting 14 includes one or more ports 59 what extend from inside the fitting 59, upstream of the valve 68, to outside of the fitting 14 yet within the housing 50. The one or more ports 59 allow the HVLP air flow to exit the fitting 14, such as when the valve 68 is closed. The fitting 14 includes channel 66 that taps the fitting 14 downstream of the valve 68. In particular, the channel 66 taps the fitting 14 downstream of the seal between the seat 64 and the gasket 70 of the poppet 62. The tube 54 is in fluid communication with the channel 66 to allow the air parameter to be measured by sensor 58, the measured air parameter representing or otherwise indicating the level of the air parameter within the fitting 14 and/or downstream of the valve 68.

The valves 30, 68, when both closed, trap pressurized air inside each of the gun 4 (specifically, upstream of the valve 30), the hose 10 (including within fittings 15, 16), and the fitting 14 (e.g., downstream of the valve 68 in the case that the valve 68 is located with the fitting 14). The contained volume between the two valves 30, 68 is referred to herein as the pneumatic circuit. In some embodiments, the hose 10 may expand while under pressure from the blower 51 to increase its volume to accommodate more pressurized air. The tube 54, in extending from the fitting 14 to the sensor 58, is a sealed, dead-end side branch of the pneumatic circuit. As such, the sensor 58 outputs a signal indicative of a parameter within the pneumatic circuit.

The pneumatic circuit serves as an accumulator by containing a reservoir of pressurized air that is released upon the opening of the valve 30. Most or essentially all of the volume of trapped air of the pneumatic circuit is located within the hose 10. The hose 10 can contain enough pressurized air, even at the low pressure used in HVLP spraying, to immediately resume spraying when the triggered 22 is actuated to open valve 30 to release pressurized air within the hose 10 into the front body portion 34 of the gun 4, even when the blower 51 is just restarting (i.e. not rotating and/or still accelerating to a normal rotational speed).

The valve 68 is located upstream from the hose 10, allowing the full volume of the hose 10 to be utilized as an air accumulator. The valve 68 may be immediately upstream of the hose 10 (e.g., within 1-3 inches from the fitting of the hose 10). Furthermore, no separate accumulator other than the gun 4, hose 10, and fittings 14-16 may be used in some embodiments. For example, the system may not have a chamber within or outside of the air supply unit 8 to store a reservoir of pressurized air for release into the front body portion 34 of the gun 4 or otherwise through the nozzle 24. In some embodiments, no separate accumulator (other than the pneumatic circuit) may be used downstream of the valve 68. In some embodiments, a separate accumulator is used (e.g., a metal tank in fluid connection with the fitting 14) and connects to the pneumatic circuit between the valves 30, 68.

It is not desirable to run the blower 51 at all times during a spraying project. Ordinarily, the user is not always spraying, and there may be prolonged periods of non-use between instances of spraying on the jobsite. An operator of an HVLP sprayer typically has frequent interruptions to their actual spraying of coatings. Users may readjust their work piece, configure taping or masking on the work piece or within their work areas, or focus on a different task. Conventional HVLP spray systems only turn off the air source when the power to the entire system is turned off by a manual external switch, leaving the system unpressurized and not ready for resumption of spraying before the motor 55 starts and accelerates to a speed sufficient for generating HVLP air adequate for spraying. Also, in a conventional HVLP spray system, the user must walk back to the main unit to turn it on and off, even if the user is spraying remotely via a hose. While running the blower 51 at all times provides plenty of pressurized air, even much more so than needed, such constant operation prematurely wears the blower 51, wastes energy, generates excessive heat, and creates excessive noise in the jobsite environment. To avoid excessive operation of the blower 51, the power to blower 51 can be reduced, including by being switched off, by control circuitry 56 when the user is not actuating the trigger 22 and thus not actively spraying. Pressured air trapped in pneumatic circuit can be used for immediate resumption of spraying even if power to the blower 51 is temporarily reduced upon actuation of the trigger 22, including if the blower 51 is restarting from a dead stop and thus still accelerating when the trigger 22 is actuated and the user expects to be spraying.

Figure 5:
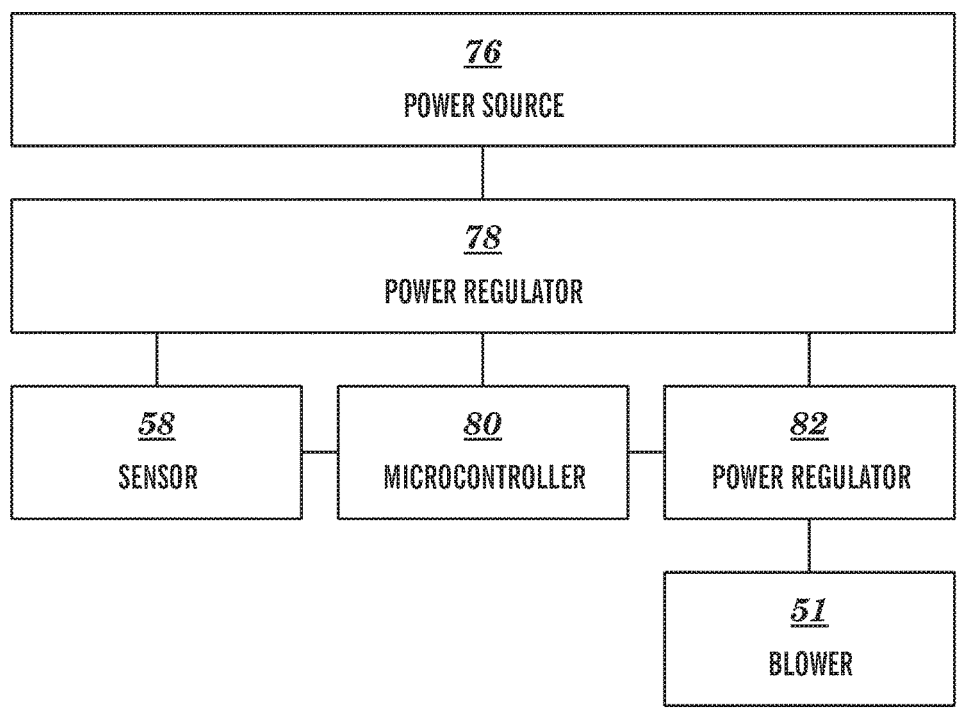
FIG. 5 is a schematic of electrical components of an HVLP sprayer.

FIG. 5 is a schematic of the electronic components which control the operation of the HVLP system 2. The microcontroller 80 and secondary power regulator 82 components can comprise the control circuitry 56. The power source 76 can be an electrical power cord supplying electrical power from a conventional wall outlet. The power source 76 can alternatively be a battery, amongst other options. The power regulator 78 can convert (e.g., alternating current to direct current via one or more diodes or other components) and regulate (e.g., lower the voltage via one or more resistors or other components) the electrical energy from the power source 76 and deliver power along multiple channels to power different components. As shown, the power regulator 78 supplies power to the sensor 58, the microcontroller 80, and the secondary power regulator 82, however power could additionally or alternatively be supplied to any other component of the HVLP system 2.

The microcontroller 80 regulates power to the blower 51. For example, the microcontroller 80 turns the blower 51 on and off, and in some cases can decrease the supply of electrical energy to the blower 51 to a non-zero level and/or can increase the supply of electrical energy to the blower 51 from a non-zero level to a higher level. In the illustrated embodiment, the secondary power regulator 82 is operated by the microcontroller 80, the secondary power regulator 82 regulating power to the blower 51 as controlled by the microcontroller 80. The secondary power regulator 82 can interrupt the supply of electrical energy to the motor 55 of the blower 51. As determined by the microcontroller 80, the secondary power regulator 82 can close to allow electrical energy to flow to the blower 51 and open to block electrical energy from flowing to the blower 51. The secondary power regulator 82 can be an electronic switch operated by the microcontroller 80. The secondary power regulator 82 can be a solid state relay. The secondary power regulator 82 can be a semiconductor device such as a bidirectional triode thyristor (i.e. a TRIAC) or an insulated-gate bipolar transistor (i.e. a IGBT). The secondary power regulator 82 can additionally or alternatively include a variable resistor or other electrical component for selectively increasing and reducing power to the blower 51 without necessarily stopping current flow (i.e. is not limited to just open and closed circuit states).

The microcontroller 80 can include, among other things, a processor and memory storing program instructions thereon which, when executed by the processor, perform or cause to be performed any of the operations referenced herein, such as part of a firmware or software program. While microcontroller 80 and secondary power regulator 82 are shown and/or referenced as being a part of the control circuitry 56, the control circuitry 56 can include different components while still being configured to perform the operations described herein. The secondary power regulator 82 can be integrated into the microcontroller 80 in some embodiments. In summary, the control circuitry 56 comprises one or more electrical components, such as the microcontroller 80, which regulate power output to the blower 51 to selectively increase and reduce power output to the blower 51.

In the preferred embodiment, the sensor 58 outputs a pressure reading, indicative of the air pressure within the pneumatic circuit, to the microcontroller 80. The microcontroller 80 monitors the pressure and, based on changes in the pressure, controls the operation of the blower 51. The microcontroller 80 increases power output to the blower 51 when the measured pressure is below a first threshold, which may include starting to deliver power to the blower 51. In this sense, the first threshold is an activation threshold. The first threshold can be less than 2 pounds per square inch, or can be 1.5 pounds per square inch (all pressure values are relative to atmospheric pressure), for example. Increasing power output to the blower 51 when the measured pressure is below the first threshold may correspond to a condition in which the whole HVLP system 2 has just been turned on (e.g., by actuation of an on/off switch on the housing 50 or by being plugged into a standard electrical wall outlet) and the pressure in the pneumatic circuit is at zero or an atmospheric level. In this case, the microcontroller 80 causes power to be output to the blower 51 to charge up the pneumatic circuit with pressurized air, even if the trigger 22 is not actuated. The microcontroller 80 continues to monitor the pressure in the pneumatic circuit, which in this case is increasing.

The signal output by the sensor 58 is indicative of whether the trigger 22 is actuated. In the case that the sensor 58 is a pressure sensor that outputs a signal indicative of the pressure within the pneumatic circuit, the air pressure measured by the sensor 58 indicates that the trigger 22 is actuated by being at a relatively low and/or decreasing level corresponding to the pneumatic circuit emptying and not trapping air (e.g., at 5 pounds per square inch or below), and indicates that the trigger 22 is not actuated by being at a relatively high and/or increasing level corresponding to the pneumatic circuit trapping air (e.g., at 8 pounds per square inch or above). The control circuitry 56 can monitor the signal output by the sensor 58 and compare to one or more thresholds to assess whether the trigger 22 is actuated or not and determine whether to change or maintain the power level output to the blower 51.

The microcontroller 80 causes a decrease in power output to the blower 51 based on the pressure rising above a second threshold. Such decrease in power output may include stopping power output to the blower 51. In this sense, the second threshold can be a deactivation threshold. The second threshold can be in the range of 7-10 pounds per square inch, or can be 7 pounds per square inch, or can be 9 pounds per square inch, amongst other options. The second threshold can represent a state in which the pneumatic circuit is charged with pressurized air and the air is not escaping the pneumatic circuit (e.g., by the trigger 22 not being actuated, thus keeping valve 30 closed). Once charged, the pressurized air remains trapped in the pneumatic circuit by valves 30, 68, ready for use upon actuation of the trigger 22. Once the measured pressure rises above the second threshold, the microcontroller 80 can either immediately reduce power to the blower 51 (e.g., by partially or completely cutting power to the blower 51) or can start a timer while maintaining the same power output to the blower 51. The counting is performed by the microcontroller 80. The timer can be five, ten, or twenty seconds in duration, amongst other options. This time setting can be adjusted to shorter or longer durations (e.g., by a user input control, which can be a dial or button interface) to best suit the user's preferences and application of the unit.

When a timer is used in association with the second threshold, the blower 51 continues to be powered during the counting of the timer at the same level as output to the blower 51 before the pressure level was recognized to cross the second threshold. This continued operation of the blower 51 may continue to build pressure within the pneumatic circuit or may just exhaust surplus pressurized air into the housing 50 of the air supply unit 8. The low pressure nature of HVLP blower 51 means that the air pressure within the accumulator may equal the air pressure output by the blower 51 within a few seconds (e.g., 2 seconds) and before the timer expires. The purpose of the timer is to keep the blower 51 operating in case the user resumes spraying shortly after having released the trigger 22, and in which case frequent stopping and starting of the blower 51 is not desired. The time in which a user retriggers to resume spraying is most likely to be soon after having released the trigger 22 (e.g., within 20 seconds). The blower 51 is left operating during the counting of the timer so that the system continues to output pressurized air in case of retriggering by the user.

If, during the counting of the timer, the pressure level drops back below the second threshold or is otherwise measured to be unstable (e.g., the pressure changes more than a predetermined amount, such as two pounds per square inch), which would be due to the user again depressing the trigger 22, then the control circuitry 56 continues to maintain the same level of power output to the blower 51 (or otherwise does not decrease power to the blower 51) while canceling the current count of the timer and/or otherwise terminating any sequence that may have been started to reduce power to the blower 51. It is noted that the pressure within the pneumatic circuit is usually below the second (deactivation) threshold while the trigger 22 is actuated and the valve 30 is open such that the measured pressure stays below, and does not cross the second threshold so long as the user continues to keep the trigger 22 actuated to continue spraying. The second threshold is set at such a level that the pressure within the pneumatic circuit will rise above the second threshold when closure of the valve 30, due to the trigger 22 no longer being actuated, stops the downstream release of pressurized air from the pneumatic circuit, thereby causing the control circuitry 56 to either immediately reduce power to the blower 51 or start the timer that may lead to reducing power to the blower 51 so long as the pressure remains above the second threshold and/or otherwise stable.

Upon expiration of the timer without the measured pressure having dropped back below the second threshold and/or the pressure having otherwise stayed stable during the counting of the time, the microcontroller 80 controls the secondary power regulator 82 to reduce the flow of electrical energy to the blower 51. The blower 51 can then remain stopped or at a lowered speed while the pneumatic circuit remains charged with air trapped between valves 30, 68, the trapped air ready to supply the gun 4 for spraying once the trigger 22 is again actuated.

When the trigger 22 is once again actuated, the accumulated volume of pressurized air in the pneumatic circuit flows through the opened valve 30 to spray paint. If the blower 51 was off or otherwise operating with reduced power when the trigger 22 was reactuated, then the pressure within the pneumatic line, as measured by the sensor 58, will drop as the valve 30 opens. A measured drop in the pressure level can initiate an increase in power output to the blower 51 by the microcontroller 80 in one or more ways, as detailed below. If the blower 51 was already on or otherwise operating with non-reduced power when the trigger 22 was reactuated, then blower 51 will continue to be supplied with the same level of power, as controlled by microcontroller 80, to provide pressurized air into the pneumatic circuit.

The following examples demonstrate various ways in which the control circuitry 56 can increase the power output to the blower 51 after having detected that the trigger 22 has been actuated. In a first example, the microcontroller 80 can be configured to increase power output to the blower 51 upon detecting the monitored pressure level dropping below a threshold (e.g., the first threshold, the second threshold, or a third threshold that is set at a pressure level between the first and second thresholds). In a second example, the microcontroller 80 can be configured to increase power output to the blower 51 upon detecting any drop in monitored pressure greater than a predetermined amount. Continuing the second example, the microcontroller 80 can be configured to increase power output to the blower 51 upon detecting a decrease in measured pressure greater than a predetermined amount, such as 3 pounds per square inch. In a third example, the microcontroller 80 can be configured to monitor the rate of change of the monitored pressure over time (e.g., by taking the derivate of the pressure signal pattern) and increase power output to the blower 51 if a rate of change of greater than a predetermined amount (e.g., 0.1 pounds per square inch per fifty milliseconds) is detected. It is noted that one or multiple of the above criteria can be monitored and used to initiate an increase in power output to the blower 51, the power output being increased when any one of the criteria is met.

Reducing power to the blower 51 based on a sensed air parameter, as discussed herein, can include either lowering the power from a first level to a second non-zero level that is lower than the first level or stopping the flow of power to the blower 51, depending on how the control circuitry 56 in the particular embodiment is configured. Lowering the power to the second non-zero level allows the blower 51 to still rotate and be poised to quickly accelerate to its previous air flow output at the first level while reducing wear, heat generation, and noise while being supplied at the second non-zero level. Likewise, increasing power to the blower 51 based on a sensed air parameter can include resuming delivery of power to the blower 51 after a state in which no power was being output to the blower 51 or can include changing power output from the second non-zero level back to the first level. Also, accelerating the blower 51 refers to increasing the rotational speed of the fan, turbine, impeller, or other bladed component of the blower 51 to increase its output of HVLP air. The blower 51 is accelerated by increasing the power output to the motor 55 of the blower 51. The blower 51 may be accelerated from a dead stop or accelerated from a first non-zero speed to a second speed that is greater than the first speed.

In summary of the preferred embodiment, the control circuitry 56 directs power to the blower 51 to move HVLP air through the pneumatic circuit and into the gun 4 as long as the trigger 22 remains actuated. When the user releases the trigger of the gun 4 to an unactuated state, the flow of air through the pneumatic circuit will be stopped by closure of valve 30. This will result in an increase in pressure within the pneumatic circuit. Very soon after the closure of valve 30 (e.g., within 3 seconds), the valve 68 will close as the pressure gradient upstream and downstream from the valve 68 equalizes due to a lack of continuous flow through the pneumatic circuit. Based on the signal output by the sensor 58 indicative of the pressure within the pneumatic circuit, the control circuitry 56 will recognize that the pressure within the pneumatic circuit has crossed a threshold pressure (e.g., the first, second, or third threshold discussed above). The control circuitry 56 will then initiate the counting of a timer. The timer will begin to count to a predetermined value (e.g., 10 seconds) and then stop outputting power to the blower 51 if the pressure is maintained above the threshold and/or some other pressure threshold is not breached while the timer is counting to the predetermined value. If the pressure is not maintained during the counting, then the blower 51 shutoff sequence will be canceled and the blower 51 will continue to be powered at the same level at least until the next time the pressure within the pneumatic circuit crosses the threshold pressure. If the counting completes with the pressure being maintained above the threshold and/or some other pressure threshold is not breached while the timer is counting to the predetermined value, then the control circuitry 56 will turn off power to the blower 51 and the pneumatic circuit will hold pressure, the hose 10 functioning as an accumulator ready to supply pressurized air when the trigger 22 is again actuated. When the user pulls the trigger 22 to an actuated state, the valve 30 will open to allow pressurized air trapped within the pneumatic circuit to flow through the gun 4 to spray paint even though the blower 51 is off (or accelerating). Upon the release of pressurized air from the pneumatic circuit while the blower 51 is off (or accelerating), the control circuitry 56 will recognize that the pressure within the pneumatic circuit has dropped below a threshold pressure (e.g., the first, second, or third threshold discussed above) and will immediately resume output of power to the blower 51. Upon the blower 51 reestablishing positive air flow, the valve 68 will re-open due to the upstream pressure being greater than the downstream pressure and the system will once again run in a sustained spraying mode so long as the trigger 22 remains actuated. It is noted that the measured pressure rising above a threshold indicates that the pressure has increased while the measured pressuring falling below a threshold indicates that the pressure has decreased.

In an alternative design, the sensor 58 is an air flow sensor placed in the pneumatic circuit, such as within the air flow path with fitting 14. The air flow sensor can be a hot wire mass airflow sensor or a spring-loaded air flap attached to a potentiometer, amongst other options. The air flow sensor outputs a signal to the microcontroller 80 indicative of the mass of air flow in the pneumatic circuit. The level of air flow as indicated by the signal can be used to increase and decrease power output to the blower 51 by the control circuitry 56 in the same manner as when a pressure sensor output the signal as discussed herein. As such, the conditions for increasing and decreasing power to the blower 51 as described based on pressure as described herein can apply to a system using an airflow sensor instead of a pressure sensor, wherein low or no air flow corresponds to a low or no pressure condition (in which the control circuitry 56 increases power to the blower 51) and high air flow corresponds to a high pressure condition (in which the control circuitry 56 decreases power to the blower 51). Therefore, all options discussed herein for a blower 51 modulated by an air pressure signal can be applied similarly in a system modulated by an air flow signal.

The benefits of this designs presented herein include the ability to achieve good spray atomization due to the use of the hose 10 as an accumulator to provide instant positive air flow when the trigger 22 is first actuated even if the blower 51 is not powered, is operating at a low power setting, and/or is accelerating to a higher speed. The transition from using trapped air in the pneumatic circuit for spraying to using pressurized air continuously flowing from the blower 51 (once fully accelerated) for spraying can be seamless to the user. Allowing the blower 51 to stop or operate at a low power setting when the trigger 22 is not actuated minimizes motor wear, energy consumption, heat generation, and noise.

The present disclosure is made using an embodiment and examples to highlight various inventive aspects. Modifications can be made to the embodiment presented herein without departing from the scope of the invention. As such, the scope of the invention is not limited to the embodiment disclosed herein.

The following is claimed:

1. A sprayer comprising:
    an air supply unit comprising an motor, the air supply unit configured to output a flow of pressurized air by operation of the motor;
    a hose having a first end and a second end, the first end receiving the pressurized air output by the air supply unit;
    a spray gun having a trigger and a first valve, the second end of the hose connected to the spray gun, wherein actuation of the trigger causes the first valve to open and the spray gun to spray fluid using the pressurized air from the hose;
    a second valve located upstream of the hose and through which at least a portion of the pressurized air output by the air supply unit flows;
    a sensor that outputs a signal indicative of whether the trigger is actuated; and
    control circuitry that receives the signal and regulates power output to the motor, the control circuitry configured to reduce electrical power output to stop the motor such that the air supply unit stops outputting the flow of pressurized air based on the signal indicating that the trigger is not actuated, and increase electrical power output to restart the motor such that the air supply unit resumes outputting the flow of pressurized air based on the signal indicating that the trigger is actuated,
    wherein a volume of the pressurized air is trapped within the hose by the first and second valves when the first and second valves are closed, and the volume of the pressurized air is used by the spray gun for spraying while the trigger is actuated yet the motor is accelerating.

2. The sprayer of claim 1, wherein the sensor is a pressure sensor.

3. The sprayer of claim 2, wherein the signal is indicative of the pressure of the pressurized air when the pressurized air is either trapped or flowing between the first and second valves.

4. The sprayer of claim 3, wherein the control circuitry is configured to reduce electrical power output to the motor based on the signal indicating that the trigger is not actuated by indicating that the pressure of the pressurized air has increased.

5. The sprayer of claim 4, wherein the control circuitry is configured to increase electrical power output to the motor based on the signal indicating that the trigger is actuated by indicating that the pressure of the pressurized air has decreased.

6. The sprayer of claim 2, wherein the sensor is exposed to pressurized air via a tube that branches from a pneumatic circuit between the first and second valves.

7. The sprayer of claim 1, wherein the second valve is located within a fitting to which the hose attaches.

8. The sprayer of claim 1, wherein the second valve is a check valve.

9. The sprayer of claim 1, wherein the first valve is located within a body of the spray gun.

10. The sprayer of claim 1, wherein the air supply unit comprises a blower.

11. The sprayer of claim 1, wherein, in reaction to actuation of the trigger, the volume of the pressurized air that was trapped in the hose is released into the spray gun and used for spraying fluid while the control circuitry increases electrical power output to the motor to accelerate the motor to resupply pressurized air to the hose.

12. The sprayer of claim 1, wherein the control circuitry is configured to reduce electrical power output to the motor based on the signal indicating that the trigger is not actuated by: starting a timer for a predetermined amount of time and then reducing electrical power output to the motor if the signal indicates that the trigger was not actuated during the counting of the timer, but not reducing electrical power output to the motor if the signal indicates that the trigger was actuated during the counting of the timer.

13. The sprayer of claim 1, wherein the air supply unit comprises a fan, an impeller, or a turbine that is rotated by the motor to generate the flow of pressurized air.

14. The sprayer of claim 1, further comprising a fluid reservoir attached to the spray gun from which the spray gun draws fluid for spraying.

15. A sprayer comprising:
a blower configured to output a flow of pressurized air by operation of a motor;
a hose;
a spray gun having a trigger and a first valve, the spray gun receiving the flow of pressurized air from the blower through the hose, wherein actuation of the trigger causes the first valve to open and the spray gun to spray fluid;
a second valve, the second valve being a check valve, wherein the flow of pressurized air flows through each of the first and second valves when the first and second valves are in open states, and the second valve is configured to close based on closure of the first valve;
a pressure sensor that measures the pressure of the pressurized air within the hose between the first and the second valves and the measured pressure; and
control circuitry that receives the signal, the control circuitry configured to reduce power output to the motor of the blower based on the signal indicating an increase in air pressure within the hose between the first and second valves due to the first and second valves being closed and increase power output to the blower based on the signal indicating a decrease in air pressure within the hose between the first and second valves due to the first valve being opened while the second valve remains closed,
wherein a volume of the pressurized air is trapped within the hose between and by the first and second valves when the first and second valves are closed due to the trigger not being actuated, and in reaction to actuation of the trigger, the first valve is opened such that the volume of trapped pressurized air is released in the spray gun and used for spraying fluid while the second valve remains closed and the control circuitry increases power output to the blower to accelerate the blower to resupply the flow of pressurized air to reopen the second valve and flow through the hose to the spray gun to spray fluid.

16. The sprayer of claim 15, wherein the control circuitry is configured to reduce the power output to the motor based on the signal indicating that the pressure has increased such that the blower stops outputting the flow of pressurized air, and the control circuitry is configured to increase the power output to the motor based on the signal indicating that the air pressure has decreased such that the blower resumes the flow of pressurized air.

17. The sprayer of claim 15, wherein the pressure sensor measures the pressurized air within the hose between the first and second valves via a tube that branches from a pneumatic circuit between the first and second valves.

18. The sprayer of claim 15, wherein the control circuitry is configured to reduce electrical power output to the motor based on the signal indicating the increase in air pressure by: starting a timer for a predetermined amount of time and then reducing electrical power output to the motor if the signal indicates that the air pressure did not increase relative to a threshold amount during the counting of the timer, but not reducing electrical power output to the motor if the signal indicates that the pressure did increase relative to the threshold amount during the counting of the timer.

19. The sprayer of claim 15, wherein the blower comprises a fan, an impeller, or a turbine that is rotated by the motor to generate the flow of pressurized air.

20. A method of controlling a sprayer comprising:
providing power to a motor of an air supply unit based on a signal output from a sensor, the air supply unit outputting a flow of pressurized air, the pressurized air flowing within a hose and through two valves, the two valves respectively located upstream and downstream of the hose, the signal indicative of a parameter of the pressurized air within the hose;
reducing power to the motor to stop the motor such that the air supply unit stops outputting the flow of pressurized air based on the signal indicating an increase in a level the parameter;
increasing power to the motor to restart the motor such that the air supply unit resumes outputting the flow of pressurized air based on the signal indicating a decrease in the level of parameter; and
spraying fluid from a spray gun using a volume of the pressurized air while performing the step of increasing power to the motor, the volume of pressurized air previously having been output by the air supply unit and then trapped in the hose between the two valves while the two valves were closed and while a trigger of the spray gun was not actuated, the volume of pressurized air being released due to actuation of the trigger opening one of the two valves,
wherein the gun receives the pressurized air from the hose and each of the steps of providing, reducing, and increasing are performed by control circuitry.

21. The method of claim 20, wherein
the parameter is pressure of the pressurized air.

22. The method of claim 20, wherein the step of reducing power to the motor of the air supply unit based on the signal indicating an increase in the parameter comprises:
starting a timer for a predetermined amount of time,
starting the reduction in electrical power output to the motor if the signal indicates that the trigger was not actuated during the counting of the timer,
not reducing electrical power output to the motor if the signal indicates that the trigger was actuated during the counting of the timer.

23. A method of controlling a sprayer for spraying fluid, the method comprising:
providing power to a motor that rotates part of a blower to generate a flow of pressurized air that sprays fluid from a gun, the flow of pressurized air flowing though:
a hose;
a first valve located within the gun and downstream of the hose; and
a second valve located upstream of the hose, the flow of pressurized air passing through the first and second valves to spray fluid when the first and second valves are both open;
reducing power to the motor based on a pressure sensor indicating that the air pressure within the hose between the first and second valves has increased due to the first valve having been closed while the second valve was open, the first valve having been closed due to a trigger of the gun being released;
trapping a volume of the pressurized air output by the blower within the hose by the first and second valves both being closed, the second valve closing due to the first valve being closed;

spraying fluid from the spray gun while the second valve remains closed by using the volume of the pressurized air that was trapped in the hose, the volume of air being released from the hose by actuation of the trigger opening the first valve; and increasing power to the motor based on the pressure sensor indicating that the air pressure within the hose between the first and second valves has decreased due to the first valve having been opened to release the volume of the pressurized air that was trapped in the hose for spraying;

wherein the step of increasing power to the motor is performed during the step of spraying fluid, and the step of increasing power to the motor results in the flow of pressurized air reopening the second valve and flowing through the hose and the gun to spray fluid.

* * * * *